US010445893B2

(12) United States Patent
Bleyer et al.

(10) Patent No.: US 10,445,893 B2
(45) Date of Patent: Oct. 15, 2019

(54) DOT-BASED TIME OF FLIGHT

(71) Applicant: Microsoft Technology Licensing, LLC, Redmond, WA (US)

(72) Inventors: Michael Bleyer, Seattle, WA (US); Raymond Kirk Price, Redmond, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/455,808

(22) Filed: Mar. 10, 2017

(65) Prior Publication Data

US 2018/0260967 A1 Sep. 13, 2018

(51) Int. Cl.
| | |
|---|---|
| *G06T 7/557* | (2017.01) |
| *G06T 7/521* | (2017.01) |
| *H04N 5/225* | (2006.01) |
| *G01S 17/89* | (2006.01) |
| *G01B 11/25* | (2006.01) |

(52) U.S. Cl.
CPC .............. *G06T 7/557* (2017.01); *G01B 11/25* (2013.01); *G01S 17/89* (2013.01); *G06T 7/521* (2017.01); *H04N 5/2252* (2013.01); *G06T 2207/10016* (2013.01); *G06T 2207/10028* (2013.01); *G06T 2207/10052* (2013.01)

(58) Field of Classification Search
None
See application file for complete search history.

(56) References Cited

U.S. PATENT DOCUMENTS

| | | |
|---|---|---|
| 8,786,730 B2 | 7/2014 | Tardif et al. |
| 9,056,254 B2 | 6/2015 | Pellman et al. |
| 9,098,908 B2 | 8/2015 | Kirk et al. |
| 9,137,463 B2 | 9/2015 | Gilboa et al. |
| 9,182,490 B2 | 11/2015 | Velichko et al. |
| 9,280,829 B1 | 3/2016 | Lewis et al. |
| 9,297,889 B2 | 3/2016 | Hudman et al. |
| 9,330,464 B1 | 5/2016 | Ackerman et al. |

(Continued)

FOREIGN PATENT DOCUMENTS

WO 2015199615 A1 12/2015

OTHER PUBLICATIONS

Falie, et al., "Further Investigations on ToF Cameras Distance Errors And Their Corrections", In IEEE 4th European Conference on Circuits and Systems for Communications, Jul. 10, 2008, pp. 197-200.

(Continued)

*Primary Examiner* — David Perlman
(74) *Attorney, Agent, or Firm* — Ray Quinney & Nebeker P.C.; Paul N. Taylor (57) ABSTRACT

A system for three-dimensional imaging includes a structured light illuminator, an imaging sensor, and a time-of-flight controller in data communication with the structured light illuminator and the imaging sensor. The structured light illuminator provides an output light in a structured light pattern and the imaging sensor receives a reflected portion of the output light. The time-of-flight controller coordinates the structured light illuminator and imaging sensor and calculates a time-of-flight of the output light and the reflected portion.

20 Claims, 5 Drawing Sheets

(56) References Cited

U.S. PATENT DOCUMENTS

| | | | |
|---|---|---|---|
| 9,435,891 B2 | 9/2016 | Oggier | |
| 2005/0248749 A1* | 11/2005 | Kiehn | G01S 7/4873 356/28 |
| 2007/0001111 A1* | 1/2007 | Rueb | F16P 3/141 250/236 |
| 2012/0045330 A1* | 2/2012 | Wu | F03D 7/042 416/1 |
| 2013/0148102 A1 | 6/2013 | Oggier | |
| 2015/0253429 A1* | 9/2015 | Dorrington | G01S 17/89 356/5.01 |
| 2015/0310663 A1* | 10/2015 | Yamasaki | H04N 9/31 348/136 |
| 2016/0109575 A1 | 4/2016 | Oggier et al. | |
| 2016/0116576 A1 | 4/2016 | Barnes | |
| 2016/0314613 A1 | 10/2016 | Nowozin et al. | |
| 2016/0365846 A1* | 12/2016 | Wyland | G01S 17/105 |
| 2018/0083409 A1* | 3/2018 | Pettazzi | H01S 3/0621 |
| 2018/0259625 A1* | 9/2018 | Gnecchi | G01S 7/4816 |

OTHER PUBLICATIONS

"International Search Report and Written Opinion Issued in PCT Application No. PCT/US18/020827", dated May 28, 2018, 14 Pages.

"LIMA", http://hptg.com/product/, Retrieved on: Nov. 22, 2016, 9 pages.

"Trinity New!", http://hptg.com/product/, Retrieved on: Nov. 22, 2013, 9 pages.

Zhu, et al., "Fusion of Time-of-Flight Depth and Stereo for High Accuracy Depth Maps", In Proceedings of IEEE Conference on Computer Vision and Pattern Recognition, Jun. 23, 2008, pp. 1-8.

* cited by examiner

DOT-BASED TIME OF FLIGHT

CROSS-REFERENCE TO RELATED APPLICATIONS

N/A

BACKGROUND

Background and Relevant Art

Three-dimensional (3D) imaging systems are configured to identify and map a target based on light that is reflected from the target. Many of these imaging systems are configured with a light source that is configured to emit light towards the target and a photoreceptor to receive the light after it is reflected back from the target.

Some imaging systems (i.e., time-of-flight imaging systems) are capable of identifying the distances and positions of objects within a target environment at any given time by measuring the elapsed time between the emission of light from the light source and the reception of the light that is reflected off of the objects.

A conventional time-of-flight (TOF) imaging system emits an output light in a broad beam to flood a field of illumination with the output light. A camera of the TOF imaging system collects a series of subframes as the output light reflects off objects and the environment in the field of illumination and returns to the imaging system. The imaging system can then calculate depth of the objects in the field of illumination by the TOF of the light reflecting from the objects and returning to the camera.

Because the TOF calculations are based upon precise measurements correlated to the output of the output light, the imaging system must be able to positively discern the reflected light from any ambient light. Therefore, the imaging system must produce a higher intensity output light than the ambient light and/or provide an output light sufficient to create an identifiable signal reflecting from low-reflection objects and/or specular reflective objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a system for three-dimensional imaging includes a structured light illuminator, an imaging sensor, and a time-of-flight controller in data communication with the structured light illuminator and the imaging sensor. The structured light illuminator provides an output light in a structured light pattern and the imaging sensor receives a reflected portion of the output light. The time-of-flight controller coordinates the structured light illuminator and imaging sensor and calculates a time-of-flight of the output light and the reflected portion.

In other embodiments, a method for three-dimensional imaging includes emitting dot-pattern output light from a structured light illuminator, receiving a reflected portion of the dot-pattern output light with an imaging sensor, calculating a time-of-flight (TOF) of the dot-pattern output light and the reflected portion of the output light, and calculating depth information based upon the TOF.

In yet other embodiments, the method includes applying a detection threshold to the reflected portion of the output light detected by the imaging sensor. The detection threshold may be based at least partially upon a detected peak intensity of the reflected portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include improved imaging systems, as well as devices, systems, and methods for improving efficiency and resolution in three-dimensional (3D) imaging.

With regard to the following disclosure, it will be appreciated that in the development of the disclosed embodiment(s), as in any engineering or design project, numerous embodiment-specific decisions will be made to achieve the developers' specific goals, such as compliance with system-related and business-related constraints, which may vary from one embodiment to another. It will further be appreciated that such a development effort might be complex and time consuming, but would nevertheless be a routine undertaking of design, fabrication, and manufacture for those of ordinary skill having the benefit of this disclosure.

In some embodiments, a time-of-flight (TOF) 3D imaging system may include a structured light illuminator. The structured light illuminator may provide an output light in a field of illumination that has concentrated points of illumination. For example, the illuminator may include a diffraction optical element (DOE) that diffracts the output light into a geometric pattern of high-intensity nodes and low-intensity areas distributed therebetween. In some embodiments, such as the embodiments depicted and described in FIG. 1, the nodes may be substantially circular dots. In other embodiments, the nodes may be squares, triangles, hexagons, other regular shapes, irregular shapes, or combinations thereof. The nodes concentrate the output of the illuminator to produce small regions of intensity greater than that of an equivalent flood illumination from the same light source.

The nodes may provide high-intensity illumination to area of a field of illumination to produce a detectable reflected light from distance objects, low-reflectivity ("dark") objects, specular reflective surfaces (e.g., shiny surfaces that have low reflectivity toward the illuminator and/or imaging system), or other objects that produce a low reflected signal relative to the light source. The higher intensity nodes, relative to a flood illumination, may therefore allow imaging of a variety of low-reflectivity objects or environments even in the presence of high ambient light.

Figure 1:
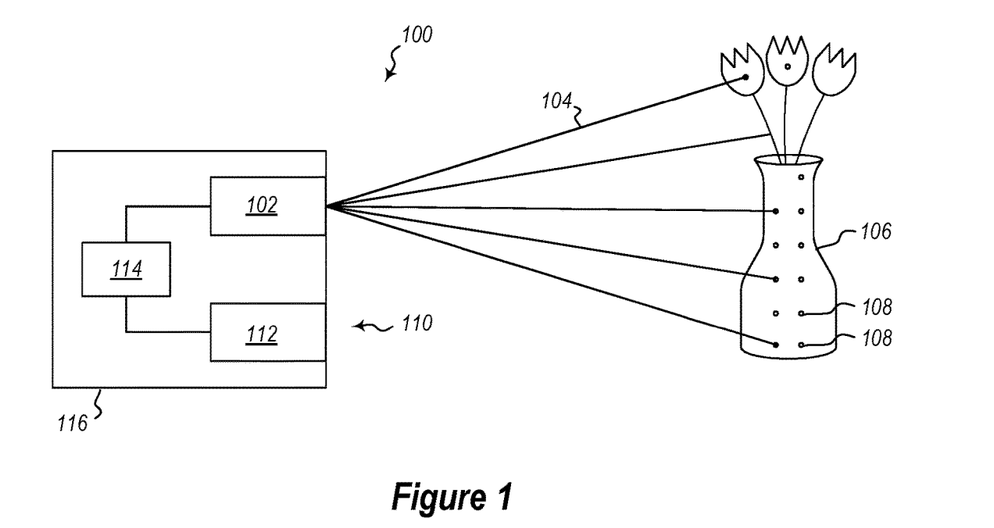
FIG. 1 is a schematic representation of an embodiment of a time-of-flight (TOF) imaging system.

FIG. 1 is a schematic representation of a 3D imaging system 100 including a structured light illuminator 102. The structured light illuminator 102 is configured to produce an output light 104 in a structured light pattern. The structured light pattern may be any appropriate pattern and/or may be generated by any appropriate method. For example, the structured light pattern may be generated by positioning a DOE in the path of an emitted light from the illuminator 102 to diffract the output light 104. In other examples, the structured light illuminator 102 may include a plurality of discrete light sources (e.g., a plurality of laser diodes) that are arranged to provide the structured light pattern.

The output light 104 may interact with an object 106 in the field of illumination of the illuminator 102. The output light 104 may interact with the object 106 in a plurality of high-intensity nodes 108 (relative to the illumination power between the nodes 108) before reflecting from the object 106. At least a portion of the reflected light 110 may be detected by an imaging sensor 112 in the 3D imaging system 100.

The imaging sensor 112 and the illuminator 102 may be coordinated by a TOF controller 114 in data communication with both the illuminator 102 and the imaging sensor 112. The TOF controller 114 may coordinate the emission of the output light 104 and the detection of the reflected light 110 to calculate the TOF of subframes, calculate depth information of the subframes, and compile the subframes into a complete frame including depth information.

In some embodiments, the 3D imaging system 100 may be positioned in a housing 116. The housing 116 may be a desk or table-mounted device, a portable device, a wearable device, or a vehicle. For example, the housing 116 may be a laptop or electronic device housing to allow gesture recognition or biometric identification. In other examples, the housing 116 may be a head-mounted device (HMD) to identify objects or hazards in the environment around the user for safety or interaction with the environment. For example, a virtual reality system that obstructs the user's vision of the environment may use a 3D imaging system 100 to detect objects or hazards in the surrounding environment to provide warnings to the user of nearby objects or obstructions. In another example, a mixed reality system that blends virtual information and images with the user's surroundings may use a 3D imaging system 100 to detect objects or people in the user's environment to integrate the virtual information with the physical environment and objects. In yet other examples, a housing 116 for a 3D imaging system 100 may be a vehicle body, such as that of an aerial vehicle (e.g., a drone) or an automobile to allow autonomous driving, semi-autonomous driving, or driving assists to the operator.

Figure 2A:
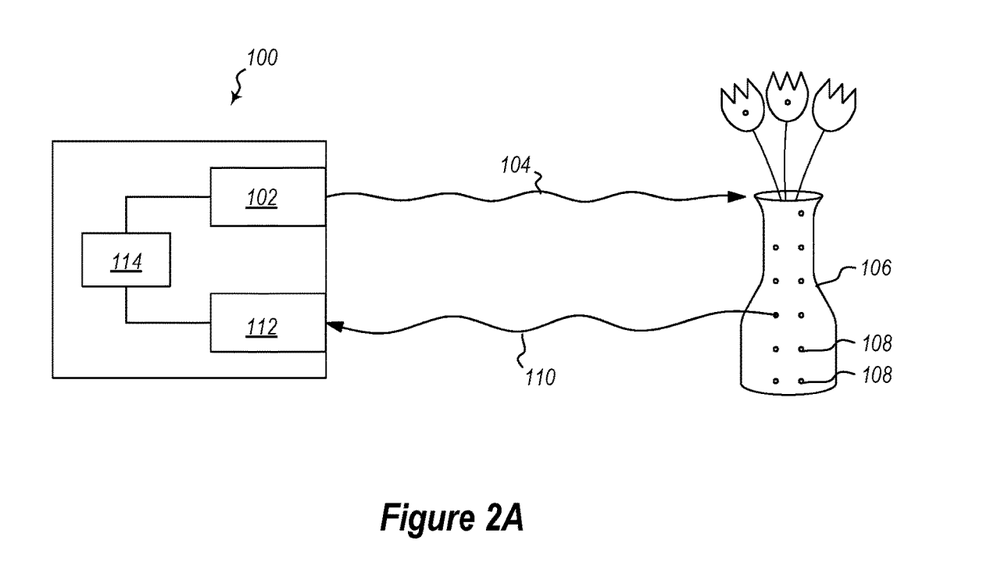
FIG. 2A is a schematic representation of the embodiment of a TOF imaging system measuring a TOF of an output light and receiving a reflected portion.
Figure 2B:
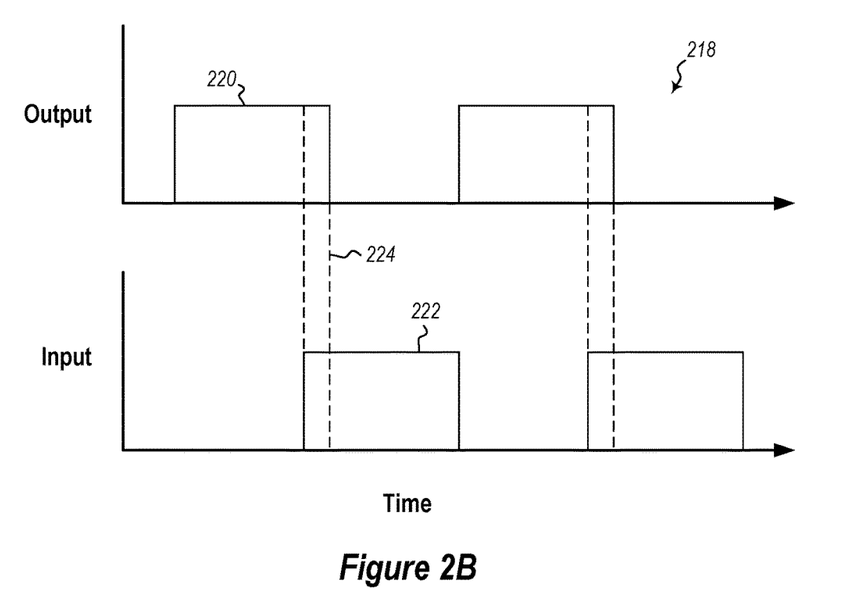
FIG. 2B is a graph illustrating the timing of the embodiment of a TOF imaging system in FIG. 2A.

FIGS. 2A and 2B illustrate the operation of the TOF imaging system 100 and the corresponding timing of the emission and detection of light. FIG. 2A illustrates the illuminator 102 providing the output light 104. The output light 104 may illuminate the object 106 at a plurality of nodes 108, and the imaging sensor 112 may detect a portion of the reflected light 110. The TOF controller 114 may measure the distance to the object 106 by measuring the TOF of the output light 104 and the reflected light 110.

FIG. 2B depicts a time-coordinated graph 218 of the output signal 220 and the input signal 222 of the TOF imaging system 100 of FIG. 2A. The output signal 220 may be emitted for a first duration, and the reflected light may be detected as the input signal 222 may be received for a second duration. In phase-modulated TOF, the correlation 224 between the output signal 220 and the input signal 222 may allow calculation of a phase difference between the output light and the reflected light, which, in turn, may allow the TOF controller 114 of FIG. 2A to calculate the depth of the object reflecting the input signal 222. In gated TOF, the temporal displacement of the output signal 220 and the input signal 222 may allow the TOF controller 114 of FIG. 2A to calculate the depth of the object reflecting the input signal 222. Because the correlation 224 and/or displacement of the output signal 220 and the input signal 222 may have a short duration (e.g., on the order of microseconds to nanoseconds), an increased signal-to-noise ratio provided by concentrating illumination power at nodes may improve depth calculations.

Figure 3:
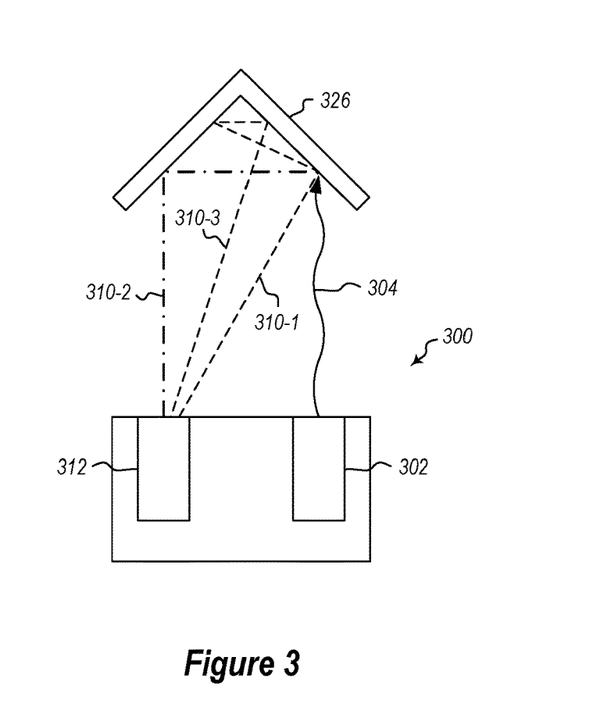
FIG. 3 is a top schematic view of a multi-path reflection of a single point of output light.

FIG. 3 illustrates another application of an embodiment of a TOF imaging system 300, according to the present disclosure. A TOF imaging system 300 may emit an output light 304 with an illuminator 304 that may scatter upon contacting an object and may reflect back to the imaging sensor 312 through a plurality of paths. For example, this "multipath" scenario may occur when an output light 304 interacts with a wall 326 or corner wall. The output light 304 may interact with the wall 326 and reflect directly back to the imaging sensor 312 in a first reflected light 310-1. Additionally, the output light 304 may interact with the wall 326 and scatter toward another portion of the wall 326 before reflecting back toward the imaging sensor 312 as a second reflected light 310-2 that experienced a longer flight path than the first reflected light 310-1. Similarly, another portion of the output light 304 may scatter off a corner of the wall more than once and eventually scatter back toward the imaging sensor 312 as a third reflected light 310-3 that experienced an even longer flight path than the second reflected light 310-2.

In a TOF imaging system, the imaging system would detect at least three distinct reflected lights 310-1, 310-2, 310-3 at different times from the same location on the wall 326 from the same output light 304. The TOF imaging system may be unable to accurately determine the depth of the wall 326, therefore, as a signal point produces multiple input signals for the depth calculations. In some embodiments, the higher intensity of the nodes described herein may allow for greater intensity contrast between the first reflected light 310-1 (i.e., the correct input signal for the depth calculation) compared to the second reflected light 310-2 and/or the third reflected light 310-3.

Figure 4A:
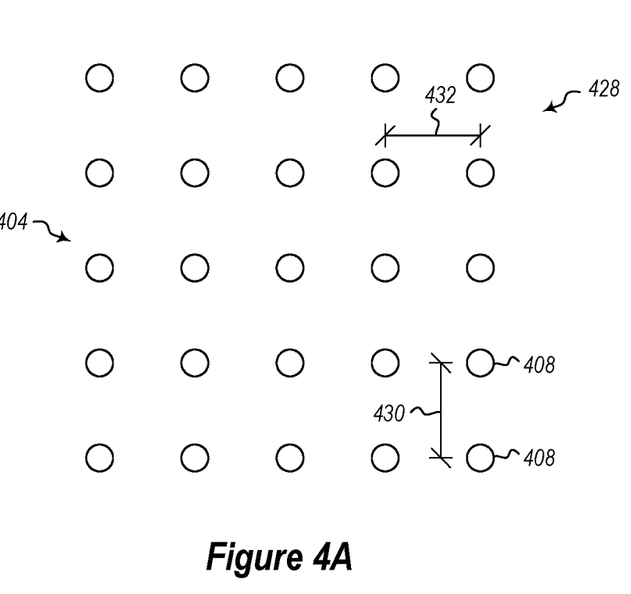
FIG. 4A is a schematic representation of an embodiment of a rectangular grid structured light pattern produced by an illuminator according to the present disclosure.
Figure 4B:
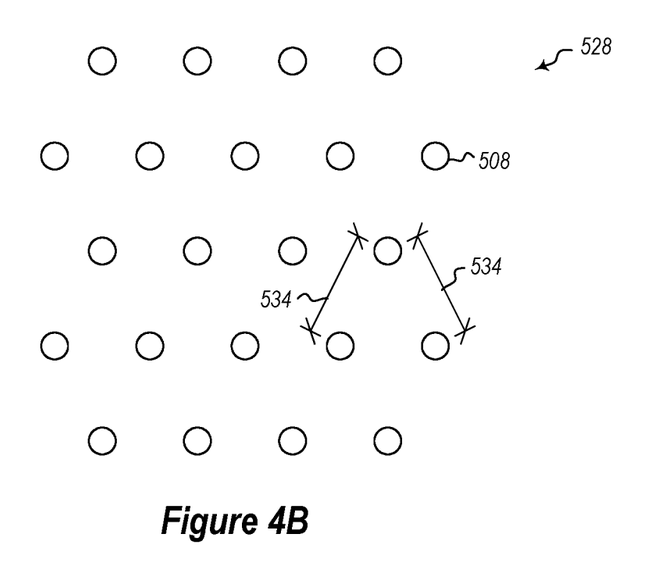
FIG. 4B is a schematic representation of an embodiment of an equidistant hexagonal structured light pattern produced by an illuminator according to the present disclosure.

For example, FIG. 4A and FIG. 4B illustrate example structured light patterns that may allow the concentration of illumination power at nodes. FIG. 4A is an example structured light pattern 428 in a rectangular grid. The output light 404 may be concentrated in nodes 408. The diameter of the nodes 408, as depicted in FIG. 4A may correspond to the border of the full-width half-maximum (FWHM) of the Gaussian distribution of the illumination power. In some embodiments, the more focused the output light 404 is at the nodes 408, the smaller the FWHM of the node 408 may be relative to a vertical spacing 430 (between the center of nodes 408) and/or horizontal spacing 432 (between the center of nodes 408) of the structured light pattern 428.

In some embodiments, the FWHM and the vertical spacing 430 may be related. For example, the FWHM of the node 408 may be percentage of the vertical spacing 430 in range having an upper value, a lower value, or upper and lower values including any of 2%, 4%, 6%, 8%, 10%, 12%, 15%, 20%, 25%, 50%, or any values therebetween. For example, the FWHM of the node 408 may be less than 50% of the vertical spacing 430 of the nodes 408. In other examples, the FWHM of the node 408 may be greater than 2% of the vertical spacing 430 of the nodes 408. In yet other examples, the FWHM may be between 2% and 50% of the vertical spacing 430. In further examples, the FWHM may be between 4% and 25% of the vertical spacing 430. In yet further examples, the FWHM may be between 5% and 20% of the vertical spacing 430.

In some embodiments, the FWHM and the horizontal spacing 432 may be related. For example, the FWHM of the node 408 may be percentage of the horizontal spacing 432 in range having an upper value, a lower value, or upper and lower values including any of 2%, 4%, 6%, 8%, 10%, 12%, 15%, 20%, 25%, 50%, or any values therebetween. For example, the FWHM of the node 408 may be less than 50% of the horizontal spacing 432 of the nodes 408. In other examples, the FWHM of the node 408 may be greater than 2% of the horizontal spacing 432 of the nodes 408. In yet other examples, the FWHM may be between 2% and 50% of the horizontal spacing 432. In further examples, the FWHM may be between 4% and 25% of the horizontal spacing 432. In yet further examples, the FWHM may be between 5% and 20% of the horizontal spacing 432.

FIG. 4B illustrates another embodiment of a structured light pattern 528. In some embodiments, the structured light pattern 528 may be a substantially hexagonal pattern with each node 508 having six adjacent nodes 508 positioned hexagonally about the node 508. In such a hexagonal distribution, the spacing 534 between each node 508 and adjacent nodes 508 may be substantially equal.

In some embodiments, the FWHM and the spacing 534 may be related. For example, the FWHM of the node 508 may be percentage of the spacing 534 in range having an upper value, a lower value, or upper and lower values including any of 2%, 4%, 6%, 8%, 10%, 12%, 15%, 20%, 25%, 50%, or any values therebetween. For example, the FWHM of the node 508 may be less than 50% of the spacing 534 of the nodes 508. In other examples, the FWHM of the node 508 may be greater than 2% of the spacing 534 of the nodes 508. In yet other examples, the FWHM may be between 2% and 50% of the spacing 534. In further examples, the FWHM may be between 4% and 25% of the spacing 534. In yet further examples, the FWHM may be between 5% and 20% of the spacing 534.

In some embodiments, the density of the nodes 508 may be variable. For example, the spacing 534 of FIG. 4B, or the vertical spacing 530 and/or horizontal spacing 532 of FIG. 4A, may change based on user input, predetermined values, or environmental considerations. For example, a TOF 3D imaging system according to the present disclosure may sample the field of view only at the nodes 508. The density of the nodes may determine the maximum resolution with which the environment may be imaged for depth information. For example, a low-density structured illumination source may allow for an illumination power increase of 100×, but also render the imaging relatively low resolution, which may compromise edge detection and adversely affect image recognition. In other examples, a high-density structured illumination source may provide lesser illumination power increase relative to the previous example (e.g., 10×), but provided an associated 10× increase in resolution for the same total illumination power. As described herein, a conventional flood illuminator provides a continuous illumination at a significantly lower illumination power at any given location in the field of view.

While FIG. 4A and 4B illustrate structured light patterns that are repeating and/or regular, in other embodiments, the structured light pattern may be a substantially random distribution of points. For example, in a conventional structured light 3D imaging system that uses the distortion of a given pattern to calculate the depth information, the structured light pattern may be random or non-repeating. Conventional structured light 3D imaging systems utilize the non-repeating pattern to identify displacement of unique regions of the pattern. Because the embodiments of a TOF 3D imaging system described herein utilize the measured TOF, the 3D imaging systems according to the present disclosure may additionally use repeating structured light patterns without compromising the depth calculations.

Figure 5A:
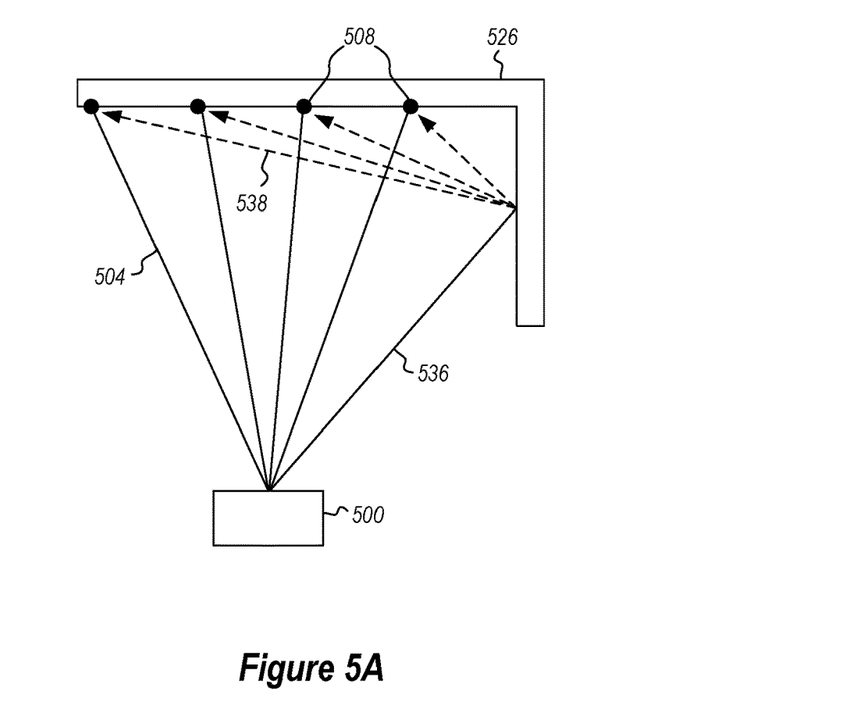
FIG. 5A is a top schematic view of an embodiment of a 3D imaging system experiencing a multi-path reflection of a single point of output light interacting with a surface illuminated with a structured light pattern.

FIG. 5A is a schematic representation of a TOF 3D imaging system 500 with a structured light illuminator, according to the present disclosure. The 3D imaging system 500 may emit an output light 504 at a plurality of nodes 508. In some embodiments, at least one of the output beams 536 may contact a side of the wall 526 and scatter towards another portion of the wall 526 where other beams are projecting at nodes 508. In a conventional TOF imaging system, scattered light creates a multipath scenario at any of the points along the back wall due to diffuse reflection. The intensity of the light scattered along the back wall is background illumination intensity. This background illumination intensity is the approximately the same for flood fill illumination and dot-based illumination in the case of diffuse reflection. The light 504 that directly bounces back from the object will measure the depth of the object without being corrupted by multipath effects is the direct illumination. The direct illumination gives the correct depth, while the background illumination gives the wrong one.

Figure 5B:
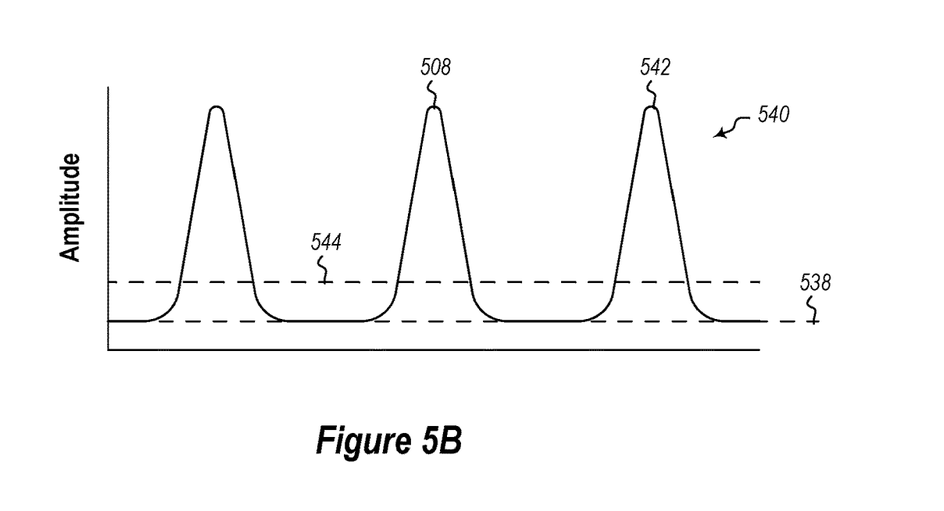
FIG. 5B is a graph illustrating the reflected light intensities generated by the embodiment of an illumination in FIG. 5A.

For example, FIG. 5B is a graph of the intensity profile 540 of the reflected light detected by the imaging sensor of the 3D imaging system 500 of FIG. 5A. The graph illustrates the peak intensities 542 at each of the nodes 508 reflecting from the wall 526 as detected by the 3D imaging system 500. The intensity profile 540 depicts a minimum level between the nodes 508 that includes the scattered light 538 being scattered evenly across the area. The peak intensity is the sum of the direct illumination and the background illumination 538. The contribution of the direct illumination to this sum is considerably higher than the contribution of the background light 538. The depth error due to 538 is therefore small in the depicted embodiment.

In a conventional TOF system with flood illumination, the background illumination 538 would still be the same, but every pixel would receive the same smaller amount of direct illumination. This direct illumination would therefore be another flat line (similar to 538) in an intensity graph. In contrast to the dot-based illumination, the amount of direct illumination might be approximately the same as the background illumination. This leads to a high depth error.

In some embodiments, the 3D imaging system 500 may apply a detection threshold 544 on the intensity profile 540 to filter out pixels that do not observe a dot. This filtering operation removes pixels that only receive background illumination leading to a wrong depth estimate. This filtering operation thereby allows consideration only of the TOF of the reflected light identified as nodes 508.

In some embodiments, the detection threshold 544 may be related to the peak intensity 544 detected. For example, the detection threshold 544 may be 5% of the peak intensity 542 of the detected intensity profile 540. In other examples, the detection threshold 544 may be 10%, 15%, 20%, 25%, 30%, 35%, 40%, 45%, 50%, or any values therebetween of the peak intensity 542. In some embodiments, the detection threshold 544 may be a dynamic value based on an instantaneous peak intensity or a time-averaged peak intensity value.

In other embodiments, the detection threshold 544 may be a constant value for a given illuminator. For example, a given illuminator may have a known peak output intensity for each node of the output light. The detection threshold 544 may be a constant value set as a percentage of the peak output intensity of the illuminator. For example, the detection threshold may be 5%, 10%, 15%, 20%, 25%, 30%, 35%, 40%, 45%, 50%, or any values therebetween of the peak output intensity of the illuminator.

Figure 6:
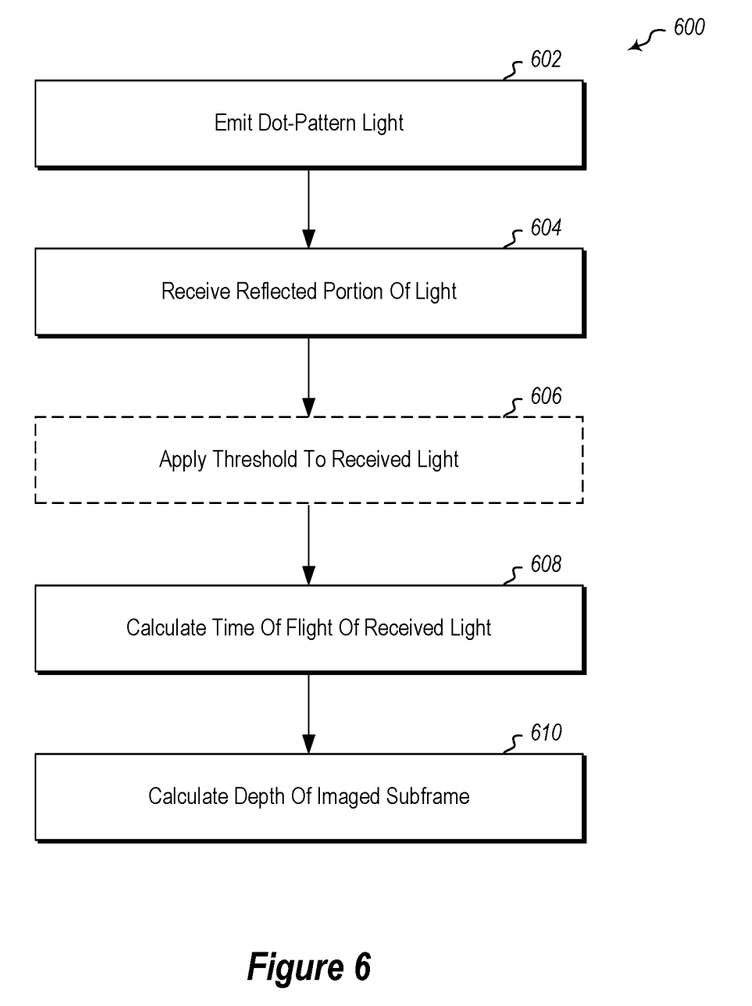
FIG. 6 is a flowchart illustrating a method of calculating depth information with a 3D imaging system, according to the present disclosure.

FIG. 6 illustrates a flowchart 600 of an embodiment of a method for 3D imaging with a TOF imaging system according to the present disclosure. The method may include emitting dot-pattern output light at 602 using a structured light illuminator. The dot-pattern may be a geometric pattern, a repeating pattern, a uniform pattern, other regular pattern, or combinations thereof In some embodiments, the dot-pattern light may be phase modulated or gated. For example, the dot-pattern light may be emitted from an infrared illuminator in modulated pulse that is controlled by a TOF controller in communication with the illuminator. The modulation may be sufficient to calculate a TOF of the dot-pattern output light and the reflected portion detected by the 3D imaging system. For example, the modulation may be greater than 1.0 Megahertz (MHz), greater than 2.0 MHz, greater than 3.0 MHz, greater than 4.0 MHz, greater than 5.0 MHz, or more. The dot-pattern light may have concentrated nodes of higher intensity output light relative to other areas around or between the nodes.

The method may further include an act of receiving a reflected portion of the light at 604. In some embodiments, the 3D imaging system may receive the reflected portion of the output light with an imaging sensor directly from a node of projected on an object. In other embodiments, the 3D imaging system may receive the reflected portion of the output light indirectly after the light has scattered from more than one surface (e.g., has experienced a multi-path scenario before being received at the 3D imaging system). In yet other embodiments, the 3D imaging system may receive the reflected portion of the output light concurrently with a portion of the ambient light in the surrounding environment.

In some embodiments, the method may optionally include applying a detection threshold to the received light at 606 to exclude scattered light that may limit and/or exclude the effect of the ambient light and/or scattered multi-path light from the detected light received from the nodes. The method may further include calculate a time of flight of the received light at 608 based on a detected correlation with the output light emitted from the illuminator. For example, a TOF controller may be in communication with the illuminator and the imaging sensor. The TOF controller may therefore be able to calculate the precise differences in the emission and receipt of the output signal and input signal, respectively, as described in relation to FIG. 2A and 2B.

The method may further include calculating depth information of the imaged subframe based at least partially upon the measured TOF at 610. In some embodiments, a plurality of subframes may be compiled by the TOF controller to form a complete frame with depth information of the entire imaged FOV.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for three-dimensional (3D) imaging, the system comprising:
   a structured light illuminator configured to provide an output light in a structured light pattern with a plurality of nodes, the plurality of nodes having a peak output intensity;
   an imaging sensor configured to detect a reflected light including at least a portion of the output light; and
   a time-of-flight (TOF) controller in data communication with the structured light illuminator and the imaging sensor to receive an intensity profile from the imaging sensor, the TOF controller having a detection threshold to filter out pixels of the intensity profile below the detection threshold, the detection threshold being based upon the peak output intensity, the TOF controller being configured to calculate a TOF of the output light and reflected light.

2. The system of claim 1, the structured light pattern being a repeating pattern.

3. The system of claim 1, at least one node of the plurality of nodes being equidistant from neighboring nodes.

4. The system of claim 1, the TOF controller being configured to measure a correlation of the output light and the reflected light.

5. The system of claim 1, further comprising a housing, wherein the structured light illuminator, imaging sensor, and TOF controller are positioned in the housing.

6. The system of claim 5, the housing being a head-mounted device.

7. The system of claim 1, the structured light pattern having a variable density.

8. The system of claim 1, at least one of the nodes having at least a 10× illumination power concentration.

9. The system of claim 1, at least one node of the plurality of nodes having a full-width half-maximum (FWHM) that is less than 50% of a spacing between node centers of the structured light pattern.

10. The system of claim 1, at least one node of the plurality of nodes having a full-width half-maximum (FWHM) that is less than 50% of a horizontal spacing between node centers of the structured light pattern and less than 50% of a vertical spacing between node centers of the structured light pattern.

11. The system of claim 10, the vertical spacing and the horizontal spacing being different.

12. A method of 3D imaging, the method comprising:
emitting dot-pattern output light from a structured light illuminator, the dot-pattern output light having a plurality of nodes, the plurality of nodes having a peak output intensity in an intensity profile;
receiving a reflected portion of the dot-pattern output light with an imaging sensor;
applying a detection threshold to the reflected portion of the output light to filter out pixels of the intensity profile below the detection threshold, the detection threshold being based upon the peak output intensity;
calculating a time-of-flight (TOF) of the dot-pattern output light and the reflected portion of the output light; and
calculating depth information based upon the TOF.

13. The method of claim 12, the plurality of nodes with a full-width half-maximum that is less than 50% of a spacing between nodes.

14. The method of claim 13, further comprising detecting a multipath scenario and applying a detection threshold to the reflected portion.

15. The method of claim 12, the dot-pattern output light having a repeating structured light pattern.

16. A method of 3D imaging, the method comprising:
emitting dot-pattern output light from a structured light illuminator, the dot-pattern output light being modulated at greater than 1.0 Megahertz and the dot-pattern output light having a plurality of nodes, the plurality of nodes having a peak output intensity in an intensity profile;
receiving a reflected portion of the dot-pattern output light with an imaging sensor;
applying a detection threshold to the reflected portion to the reflected portion of the output light to filter out pixels of the intensity profile below the detection threshold, the detection threshold being based upon the peak output intensity;
calculating a time-of-flight (TOF) of the dot-pattern output light and the reflected portion of the output light; and
calculating depth information based upon the TOF.

17. The method of claim 16, further comprising detecting an ambient light, the detection threshold being based at least partially upon a detected ambient light.

18. The method of claim 16, the detection threshold being determined at least partially based upon a detected peak intensity of the reflected light.

19. The method of claim 16, the detection threshold being less than 50% of the detected peak intensity.

20. The method of claim 16, the detection threshold being determined at least partially based upon a detected scattered light.

* * * * *